7014X
J. J. Adams,
Glass Furnace.
Patented Apr. 21, 1832.
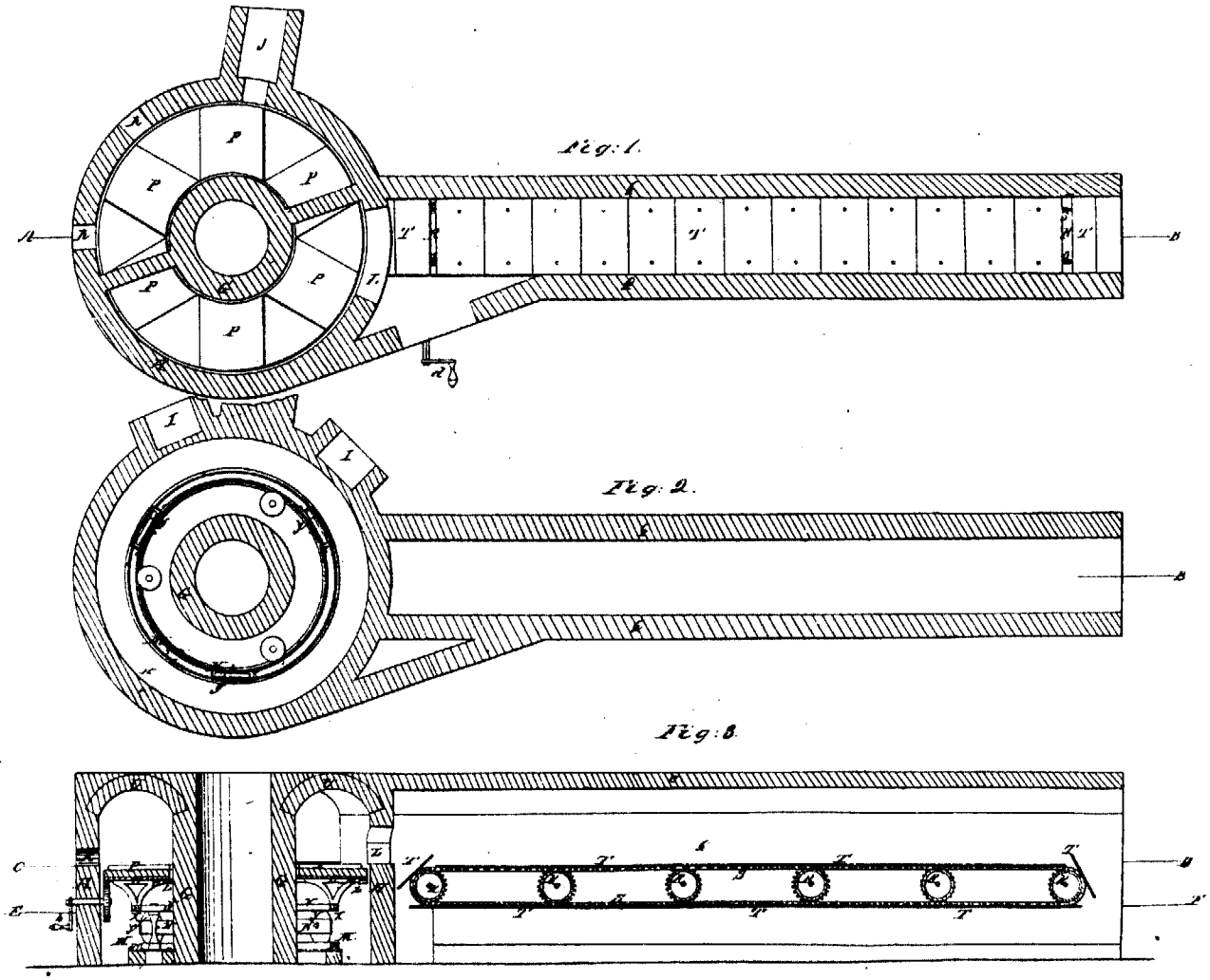

70144 Apl 21.1832 an 14 257

John J. Adams
Letters Patent Dated April 21. 1832

The Schedule referred to in these Letters Patent, and making part of the
same, containing a description in the words of the said John J. Adams
himself, of his Improvement in the process of flattening Window Glass.

---

Be it known, that I, John J. Adams, of the City of Washington, and Dis-
trict of Columbia, have made an improvement in the process of flattening
Window glass, which is described as follows. 1 The wall, inclosing the ma-
chine for flattening, is made circular, of any convenient size, and is usually
built of brick or stone. On the base, and on each side, is [illegible] to admit fire
and fuel. The stick or rear hole for admitting the glass cylinders, is left in
the wall, near the top, and within about 8 feet of the tempering arch. Two
openings for flattening mouths are also left on the same side with the flat-
tening arch, about 5 or 6 feet apart. On the cooling oven side, an opening is
left for laying the glass off the flattening stone upon the cooling or tempering
plate. 2d An inner circular wall, of about 4 feet diameter is placed
in the center of the outer circular wall before described. 3 An arch is
sprung, resting on the inner and outer circular walls, leaving a circular op-
ening within the inner circular wall of about 3 feet diameter: this may
be either built of brick or fire clay. This arch is divided into two parts
by mantles or divisions, leaving three of the flattening stones, with their
intermediate spaces in each apartment. 4 A circular railway, of about
7 feet diameter, made of cast iron is placed in the center of the before describ-
ed circular wall, having a groove or flange on it, for admitting a car-
riage with rollers supporting the flattening apparatus to be next describ-
ed. 5 The flattening apparatus, is made of sheet iron, and of a size nearly
to fill the circular space included within the circular walls; this may
be divided into four or six divisions to receive the flattening stones. The
flattening stones with their beds rest on bars or supports placed on a ring
and resting on the beforementioned rollers. 6, The cooling arch is about
30 feet long, and 3 feet wide. Two [illegible] chains, about 3 feet apart, [illegible]

[illegible] turn on 4 or 6 drums or rollers, turning on gudgeons supported in the
walls. On these chains are hinged a number of sheet iron plates about 3 feet
long and 2 1/2 feet wide. The sheets of glass are taken off the flattening stones
and placed on these revolving plates to cool. The chimneys for the fire arch-
es pass up thro' the inner circular wall; the smoke passing under the main
arch or cover, and out at the cooling arch and cooling mouth. Operation.—
The cylinder of glass is shoved thro' the stick-hole or rear, and put on one of
the intermediate spaces to heat, the flattening apparatus is then turned
till another space comes in a line with the stick hole, this brings the
first mentioned cylinder in a line with the first flattening mouth; the
glass is then laid open upon the flattening stone; the flattening apparatus
is again turned till the first cylinder on the flattening stone comes in a
line with the second flattening mouth, where it is flattened out; this move-
ment also brings the third space in a line with the stick hole; the appar-
atus is again turned another space, which brings the first cylinder into
the cooling apartment — when by turning the apparatus three sheets of glass
are in the cooling apartment, then the first sheet is placed upon the first
cooling plate. When the first cooling plate is filled, then the endless chain
with the cooling plates upon them are turned the space of one plate, by a
crank windlass placed below; and so on till the business is completed.
The invention ... here claimed and desired to be secured by Letters
Patent is the before described process of flattening and cooling glass, particular-
ly the revolving flattening apparatus, and the revolving cooling plates placed
on endless chains, likewise the arches covering the flattening & cooling ap-
paratus: For a further illustration of my invention I refer to the Model
and drawing of the same deposited in the Patent Office. In witness where-
of I have hereunto subscribed my name before two witnesses this 11th
day of April 1832.

Witnesses
William P. Elliot
William G. Cranch

John J. Adams (812 wds)

E+C.
Ch.J.W.

[illegible] May 31st 1834